United States Patent [19]
Ganz

[11] Patent Number: 5,271,457
[45] Date of Patent: Dec. 21, 1993

[54] APPARATUS FOR MIXING AND/OR KNEADING MATERIALS

[75] Inventor: Martin Ganz, Zürich, Switzerland

[73] Assignee: Buss AG, Basel, Switzerland

[21] Appl. No.: 989,129

[22] Filed: Dec. 11, 1992

[30] Foreign Application Priority Data

Dec. 14, 1991 [DE] Fed. Rep. of Germany ....... 4141329

[51] Int. Cl.⁵ .......................................... F28F 13/00
[52] U.S. Cl. .................. 165/109.1; 165/135; 366/144
[58] Field of Search ............... 165/109.1, 135; 366/144, 149

[56] References Cited

U.S. PATENT DOCUMENTS

| | | | |
|---|---|---|---|
| 1,938,377 | 12/1933 | Ducharme et al. | 165/135 X |
| 2,175,126 | 10/1939 | McCormick | 165/135 X |
| 3,464,220 | 9/1969 | Phelan | 165/169 X |
| 4,242,001 | 12/1980 | Meintker et al. | 366/75 |
| 4,977,955 | 12/1990 | Schweizer | 165/170 |
| 5,054,932 | 10/1991 | Kangas | 366/84 |

*Primary Examiner*—Allen J. Flanigan
*Attorney, Agent, or Firm*—Tarolli, Sundheim & Covell

[57] ABSTRACT

The invention provides an apparatus for mixing and/or kneading materials comprising a housing defining a mixing and kneading chamber, a mixing and kneading member located in the interior of the mixing and kneading chamber, means for driving the mixing and kneading member in a rotating and/or oscillating motion, and means for cooling the housing and, thereby, the materials processed in the mixing and kneading chamber.

The means for cooling the housing comprise cooling channels provided in the housing and a cooling medium circulating through the cooling channels. The cooling channels are provided with hollow pipe- or tube-like inserts containing the cooling medium circulating through said cooling channels, and only a part of the outer surface of the pipe- or tube-like inserts is in direct thermal contact with the walls limiting the cooling channels. Alternatively, there is provided an intermediate layer by means of which the outer surface of the pipe- or tube-like inserts is in thermal contact with the walls limiting the cooling channels.

13 Claims, 3 Drawing Sheets

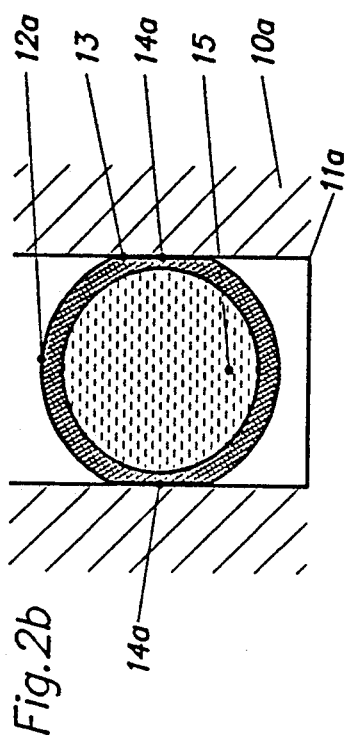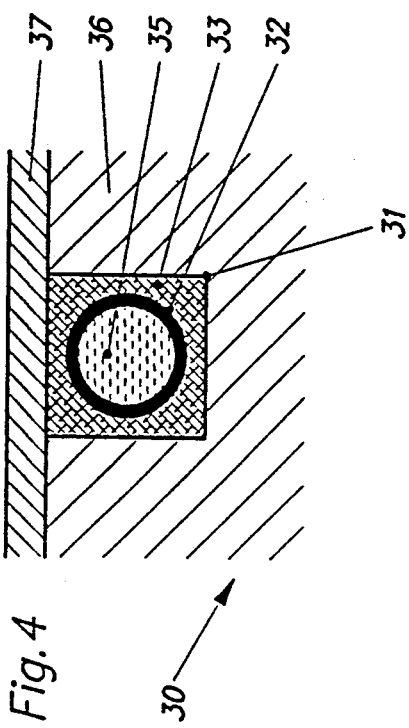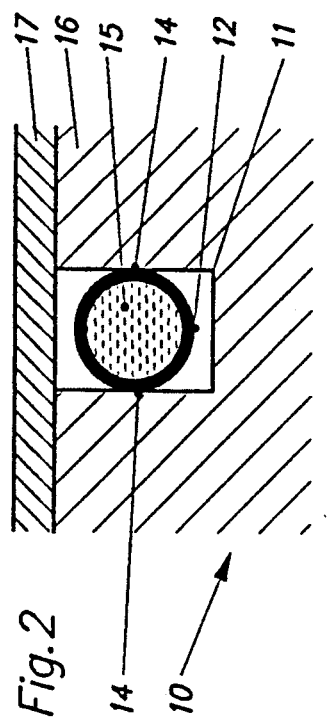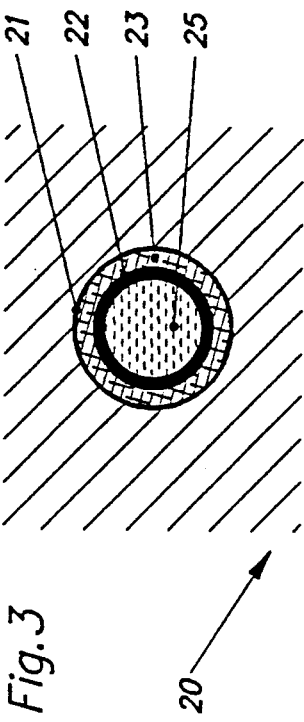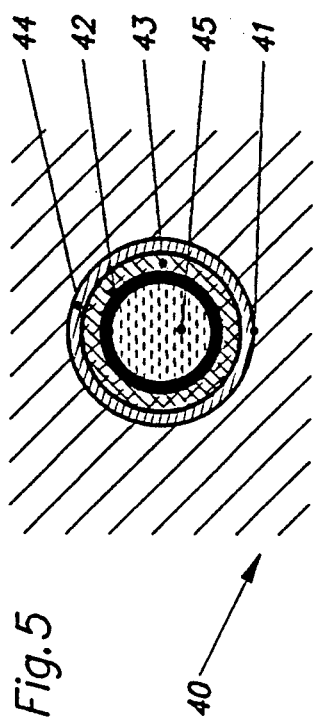

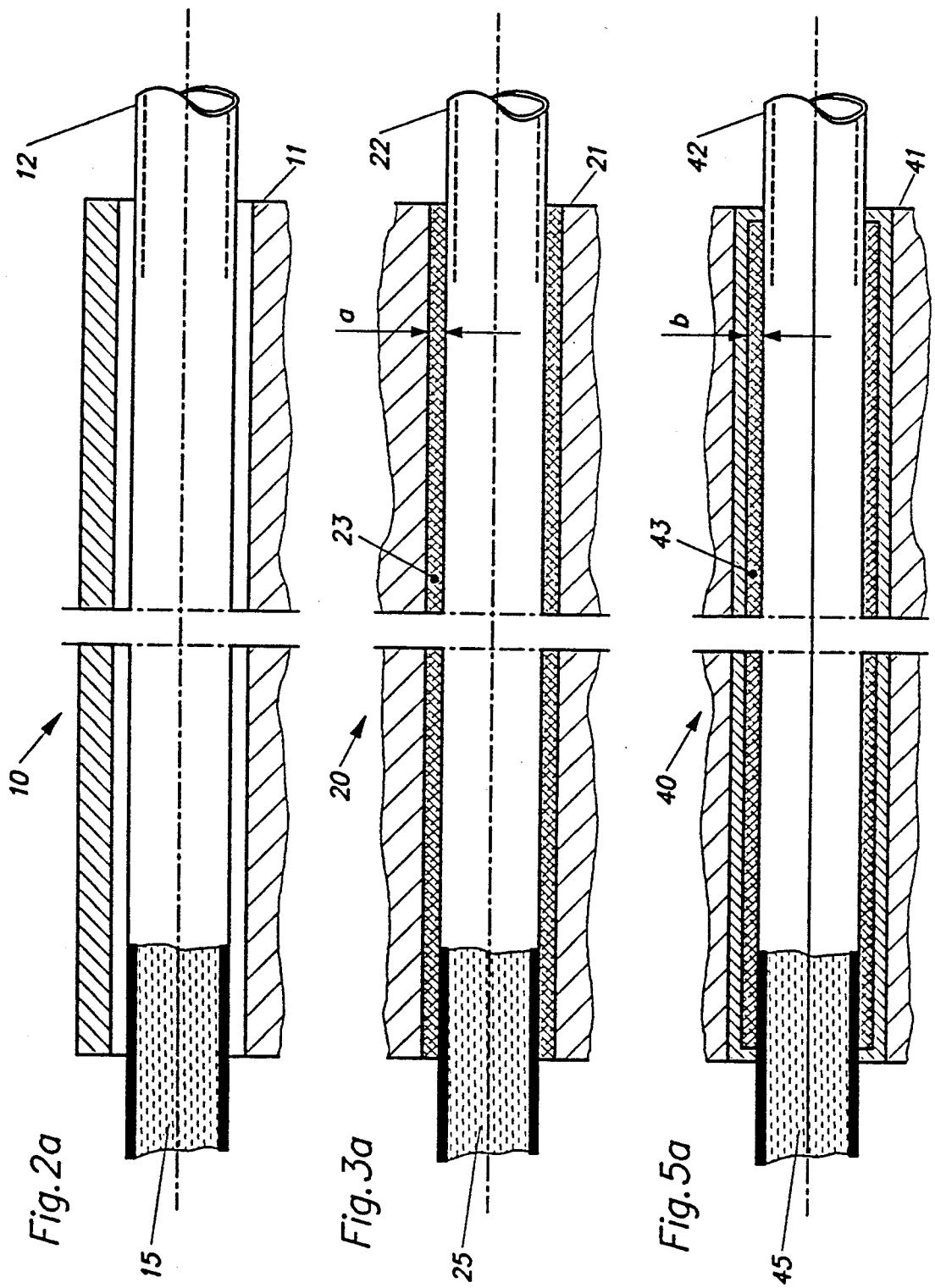

APPARATUS FOR MIXING AND/OR KNEADING MATERIALS

FIELD OF THE INVENTION

The present invention refers to an apparatus for mixing and/or kneading materials comprising a housing defining a mixing and kneading chamber, a mixing and kneading member located in the interior of the mixing and kneading chamber, means for driving the mixing and kneading member to a rotating and/or oscillating motion, means for cooling the housing and, thereby, the materials processed in the mixing and kneading chamber, the means for cooling the housing comprising cooling channels provided in the housing and a cooling medium circulating through the cooling channels.

Such an apparatus is used in processing a wide variety of materials in the general field of the process engineering and may have the form of extruders or so-called "ko-kneaders". Thereby, the housing of the apparatus and, thereby, the material processed in the operating chamber of the apparatus, must be cooled.

Generally, during the processing of the materials, it is required that a predetermined operating temperature of the housing and, thereby, of the material to be processed is observed and must be kept within narrow limits. The precise observance of the temperature, particularly of an upper limit of this temperature, is difficult particularly in such cases where the materials to be cooled have a temperature of 350°–500° C. or even more. In this case, in contrary to lower temperatures, it is not possible to use oil as a cooling medium circulating in the cooling channels because, in a continuous process and without particular precautions, oil can be used as a cooling medium under economical conditions only up to a temperature of appr. 350° C.

It would be desirable to use a cooling medium which is more economical, i.e. which has a low price and does not require special precautions. Such a cooling medium could be, for instance, water. However, water has the general disadvantage that it is vapourized at temperatures above 100° C. if it not pressurized. Since the apparatuses to be cooled in the scope of this invention often are operated with temperatures in the region of 300° to 400° C., water, if used as a cooling medium, would have to be pressurized to such a high extent that an economical operation of the apparatus would be impossible.

With the apparatuses known in the prior art, the cooling medium circulating in cooling channels of the apparatus is in direct thermal contact with the housing of the apparatus. Thus, in a process requiring such high operating temperatures as hereinbefore mentioned, water cannot be used as a cooling medium.

OBJECTS OF THE INVENTION

It is an object of the present invention to improve a mixing and/or kneading apparatus such that the housing of the apparatus and, thereby, the operating chamber of the apparatus can be evenly cooled using water as a cooling medium.

It is a further object of the present invention to improve a mixing and/or kneading apparatus such that no special measures must be taken to keep the water under high pressure.

SUMMARY OF THE INVENTION

In order to achieve these and other objects, the invention provides, according to a first aspect, an apparatus for mixing and/or kneading materials comprising a housing defining a mixing and kneading chamber, a mixing and kneading member located in the interior of the mixing and kneading chamber, means for driving the mixing and kneading member to a rotating and/or oscillating motion, and means for cooling the housing and, thereby, the materials processed in the mixing and kneading chamber.

The means for cooling the housing comprise cooling channels provided in the housing and a cooling medium circulating through the cooling channels. The cooling channels are provided with hollow pipe- or tube-like inserts containing the cooling medium circulating through said cooling channels, and only a part of the outer surface of the pipe- or tube-like inserts is in direct thermal contact with the walls limiting the cooling channels.

According to a second aspect of the invention, there is provided an apparatus for mixing and/or kneading materials comprising a housing defining a mixing and kneading chamber, a mixing and kneading member located in the interior of the mixing and kneading chamber, means for driving the mixing and kneading member to a rotating and/or oscillating motion, and means for cooling the housing and, thereby, the materials processed in the mixing and kneading chamber.

The means for cooling the housing comprise cooling channels provided in the housing and a cooling medium circulating through the cooling channels. The said cooling channels are provided with hollow pipe- or tube-like inserts containing the cooling medium circulating through the cooling channels, and there is provided an intermediate layer by means of which the outer surface of the pipe- or tube-like inserts is in thermal contact with the walls limiting the cooling channels.

BRIEF DESCRIPTION OF THE DRAWINGS

In the following, there will be described a mixing and kneading apparatus according to the prior art as well as well as an embodiment of the mixing and kneading apparatus according to the invention, with reference to the accompanying drawings, in which:

FIG. 2 shows a partial schematic cross sectional view of a mixing and kneading apparatus according to the present invention, illustrating a first embodiment of a cooling channel;

FIG. 2a shows a partial schematic longitudinal sectional view of the first embodiment of a cooling channel;

FIG. 2b shows a variation of the embodiment according to FIG. 2;

FIG. 3 shows a partial schematic cross sectional view of a mixing and kneading apparatus according to the present invention, illustrating a second embodiment of a cooling channel;

FIG. 3a shows a partial schematic longitudinal sectional view of the second embodiment of a cooling channel;

FIG. 4 shows a partial schematic cross sectional view of a mixing and kneading apparatus according to the present invention, illustrating a third embodiment of a cooling channel;

FIG. 5 shows a partial schematic cross sectional view of a mixing and kneading apparatus according to the present invention, illustrating a fourth embodiment of a cooling channel; and FIG. 5a shows a partial schematic longitudinal sectional view of the fourth embodiment of a cooling channel.

DETAILED DESCRIPTION OF THE DRAWINGS

Figure 1:
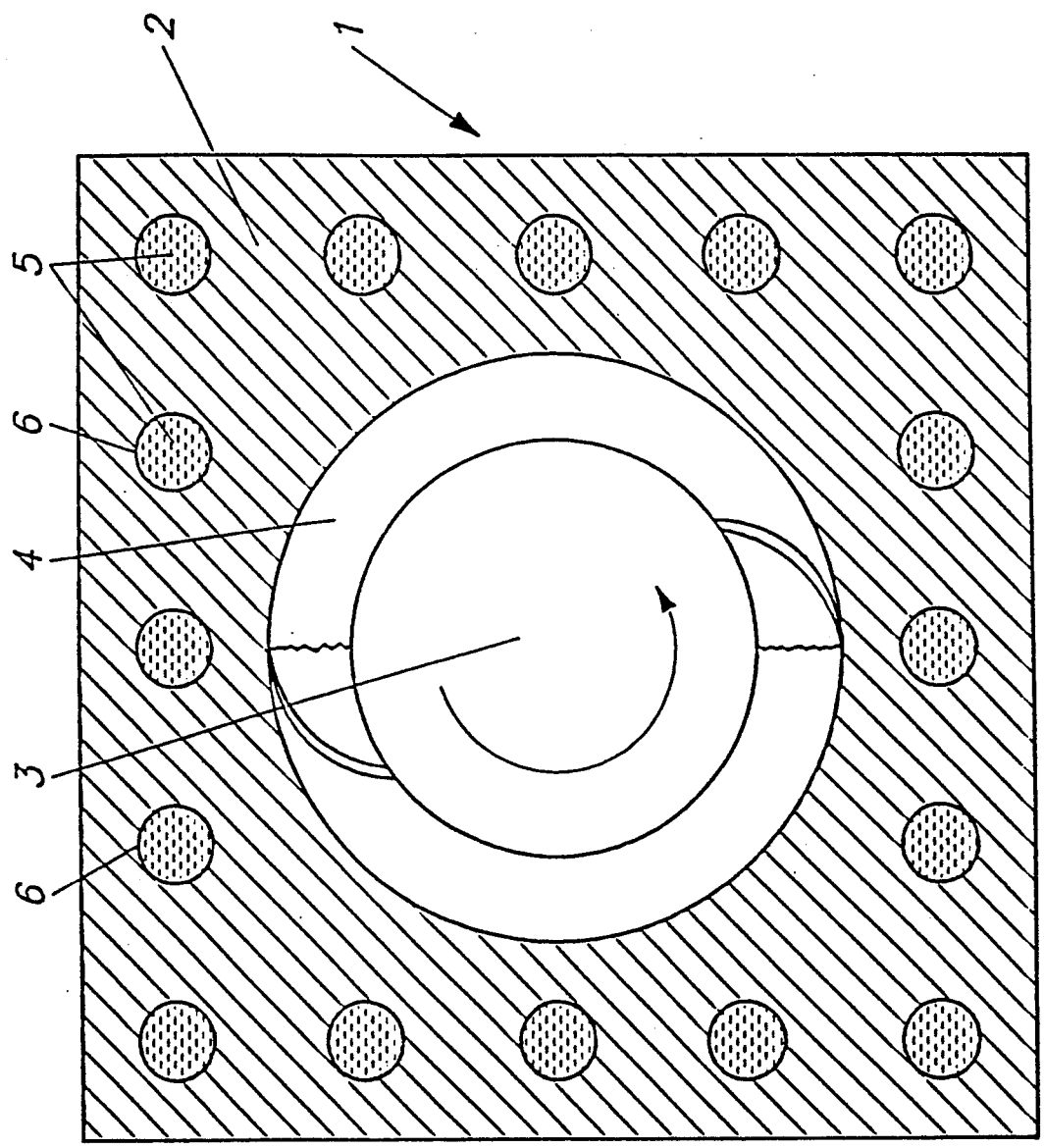
FIG. 1 shows a schematic cross sectional view of a mixing and kneading apparatus according to the prior art.

The embodiment of a mixing and kneading apparatus 1 shown in FIG. 1 and known in the prior art comprises a housing 2. The housing defines a cylindric operating chamber 4. In the interior of the cylindric operating chamber 4, there is provided a operating member 3 in the form of a mixing and/or kneading worm member which is driven to a rotating and/or oscillating motion by driving means known in the art and not shown in the drawing.

The housing 2 is provided with a plurality of cooling channels 6 in which a cooling medium 5 circulates. As can be seen in FIG. 1, the cooling channels 6 are constituted by bores provided in the housing 2. Thus, the cooling medium 5 circulating in the channels 6 is in direct thermal contact with the housing 2 with its entire surface. Thereby, the disadvantages discussed hereinabove may occur. If the cooling medium is intermittently fed in the form if separate cooling medium jets, it will be vapourized immediately with the result that the heat from the mixing and kneading apparatus is unequally or irregularly removed.

A first embodiment showing a way for an improved cooling of a mixing and kneading apparatus is shown in the FIGS. 2, 2a and 2b. Thereby, the housing 10 of the mixing and kneading apparatus is shown only in a small part. The housing comprises a housing body 16 and a housing cover 17. The housing body 16 is provided with groove-like cooling channels 11 having a rectangular cross section. The cooling channels 11 are adapted to receive tube- or pipe-like inserts 12 and 12a, respectively, in which a cooling medium circulates. The tube- or pipe-like inserts 12 and 12a, respectively, preferably are made of metal and have, in the embodiment shown in the drawings, circular cross section. However, it is also possible to use tube- or pipe-like inserts 12 and 12a, respectively, having other cross sections, e.g. oval or polygonal cross section.

According to FIG. 2, the outer diameter of the tube- or pipe-like insert 12, in this example a metallic pipe, is dimensioned such that it touches two opposite or facing walls of the cooling channel 11. Thus, the metallic pipe 12 is in thermal contact with the housing body 16 only via small contact surfaces 14. If a more intense heat transfer should be required, a pipe member 12a according to FIG. 2b can be used which comprises flattened portions 13 on two opposite sides; thus, the thermal contact area between pipe member 12a and housing body 16 is increased.

A second embodiment showing a way for an improved cooling of a mixing and kneading apparatus is shown in the FIGS. 3 and 3a. Thereby, the housing 20 of the mixing and kneading apparatus is shown only in a small part. The housing comprises cooling channels 21 in the form of circular bores. The cooling channels 21 are adapted to receive tube- or pipe-like inserts 22 in which a cooling medium 25 circulates. Between the cooling channel 21 and the tube- or pipe-like insert 22 there is provided an intermediate layer 23 in the form of a jacket surrounding the tube- or pipe-like insert 22. By means of the thickness a of the intermediate layer 23, the thermal coupling and, thereby, the heat transfer between the tube- or pipe-like insert 22 and the cooling channel 21 or, in other words, between the cooling medium 25 and the housing 20 and therewith the materials processed in the operating chamber can be controlled. By means of the material of the intermediate layer 23, the thermal coupling and, thereby, the heat transfer between the tube- or pipe-like insert 22 and the cooling channel 21 or, in other words, between the cooling medium 25 and the housing 20 and therewith the materials processed in the operating chamber can be also controlled. As a material for the intermediate layer 23, e.g. quartz sand or a mixture of quartz sand and another material with different thermal conductivity can be considered.

A third embodiment showing a way for an improved cooling of a mixing and kneading apparatus is shown in FIG. 4. Thereby, the housing 30 of the mixing and kneading apparatus is shown only in a small part. The housing comprises a housing body 36 and a housing cover 37. The housing body 36 is provided with groove-like cooling channels 31 having a rectangular cross section. The cooling channels 31 are adapted to receive tube- or pipe-like inserts 32 in which a cooling medium 35 circulates. The tube- or pipe-like inserts 32 preferably are made of metal and have, in the embodiment shown in the drawings, circular cross section. However, it is also possible to use tube- or pipe-like inserts 32 having other cross sections, e.g. oval or polygonal cross section.

In order to provide a thermal insulation between the tube- or pipe-like inserts 32 and the groove-like cooling channels 31, an intermediate layer 33 is present which fills the space between the tube- or pipe-like inserts 32 and the groove-like cooling channels 31. In this embodiment as well, by means of the thickness a of the intermediate layer 33, the thermal coupling and, thereby, the heat transfer between the tube- or pipe-like insert 32 and the cooling channel 31 or, in other words, between the cooling medium 35 and the housing 30 and therewith the materials processed in the operating chamber can be controlled. By means of the material of the intermediate layer 33, the thermal coupling and, thereby, the heat transfer between the tube- or pipe-like insert 32 and the cooling channel 31 or, in other words, between the cooling medium 35 and the housing 30 and therewith the materials processed in the operating chamber can be also be controlled. As a material for the intermediate layer 33, e.g. quartz sand or a mixture of quartz sand and another material with different thermal conductivity can be considered.

A further embodiment showing a way for an improved cooling of a mixing and kneading apparatus is shown in the FIGS. 5 and 5a. Thereby, the housing 40 of the mixing and kneading apparatus is shown only in a small part. The housing comprises cooling channels 41 in the form of circular bores. The cooling channels 41 are adapted to receive tube- or pipe-like inserts 42 in which a cooling medium 45 circulates. Between the cooling channel 41 and the tube- or pipe-like insert 42 there is provided an intermediate layer 43 in the form of a jacket surrounding the tube- or pipe-like insert 42. In contrary to the previous embodiments, the tube- or pipe-like insert 42 and the intermediate layer 43 are contained in a cartridge 44 which is embedded in the housing 40.

By means of the thickness b of the intermediate layer 43, the thermal coupling and, thereby, the heat transfer between the tube- or pipe-like insert 42 and the cooling channel 41 or, in other words, between the cooling medium 45 and the housing 40 and therewith the materials processed in the operating chamber can be controlled. By means of the material of the intermediate layer 43, the thermal coupling and, thereby, the heat transfer between the tube- or pipe-like insert 42 and the cooling channel 41 or, in other words, between the cooling medium 45 and the housing 40 and therewith the materials processed in the operating chamber can be also controlled. As a material for the intermediate layer 43, e.g. quartz sand or a mixture of quartz sand and another material with different thermal conductivity can be considered.

In contrary to the known apparatuses, the cooling medium 15, 25, 35, 45 does not circulate directly in the cooling channels, but the cooling channels 11, 21, 31, 41 receive a tube- or pipe-like insert 12, 22, 32, 42 in which the cooling medium 15, 25, 35, 45 circulates. Thus, the cooling effect of the apparatus of the invention can be directly controlled.

The aforementioned embodiments of the apparatus according to the invention have, besides the already cited characteristics, further important advantages. Several test in practice have shown that such mixing and kneading apparatuses operating with a temperature as high as 400° C. can be effectively cooled by means of water as a cooling medium and that the thereby required pressure for keeping the water in a fluid condition amounts only to a few bars.

What is claimed is:

1. An apparatus for mixing and/or kneading materials comprising:
   a housing defining a mixing and kneading chamber;
   a mixing and kneading member located in the interior of said mixing and kneading chamber;
   means for driving said mixing and kneading member to a rotating and/or oscillating motion;
   means for cooling said housing and, thereby, said materials processed in said mixing and kneading chamber;
   said means for cooling said housing comprising cooling channels provided in said housing and a cooling medium circulating through said cooling channels,
   whereby said cooling channels are provided with hollow pipe- or tube-like inserts containing said cooling medium circulating through said cooling channels, and
   whereby only a part of the outer surface of said pipe- or tube-like inserts is in direct thermal contact with the walls limiting said cooling channels.

2. An apparatus for mixing and/or kneading materials comprising:
   a housing defining a mixing and kneading chamber;
   a mixing and kneading member located in the interior of said mixing and kneading chamber;
   means for driving said mixing and kneading member to a rotating and/or oscillating motion;
   means for cooling said housing and, thereby, said materials processed in said mixing and kneading chamber;
   said means for cooling said housing comprising cooling channels provided in said housing and a cooling medium circulating through said cooling channels,
   whereby said cooling channels are provided with hollow pipe- or tube-like inserts containing said cooling medium circulating through said cooling channels, and
   whereby there is provided an intermediate layer by means of which the outer surface of said pipe- or tube-like inserts is in thermal contact with the walls limiting said cooling channels.

3. An apparatus according to claim 1 in which said pipe- or tube-like inserts comprise an outer portion or a plurality of outer portions extending along the outer surface of the inserts constituting thermal contact areas by which said pipe- or tube-like inserts are in contact with said housing.

4. An apparatus according to claim 1 or 2 in which said cooling channels have the shape of grooves.

5. An apparatus according to claim 4 in which said grooves have rectangular cross section.

6. An apparatus according to claim 1 or 2 in which said pipe- or tube-like inserts are made of metal.

7. An apparatus according to claim 1 or 2 in which said pipe- or tube-like inserts have a circular, oval or polygonal cross section.

8. An apparatus according to claim 1 in which said pipe- or tube-like inserts comprise an outer portion or a plurality of outer portions extending along the outer surface of the inserts which are flattened to increase the thermal contact areas by which said pipe- or tube-like inserts are in contact with said housing.

9. An apparatus according to claim 2 in which said intermediate layer is in the form of a jacket around said pipe- or tube-like insert.

10. An apparatus according to claim 2 in which said intermediate layer is made of a material with low thermal conductivity.

11. An apparatus according to claim 2 in which said intermediate layer is made of at least two different materials which have different thermal conductivity.

12. An apparatus according to claim 10 in which said intermediate layer is made of quartz sand.

13. An apparatus according to claim 2 in which said pipe- or tube-like insert, together with said intermediate layer, is arranged in a cartridge.

* * * * *